(12) United States Patent
Wasserman

(10) Patent No.: US 6,222,630 B1
(45) Date of Patent: Apr. 24, 2001

(54) MEASURING AND COMPENSATING FOR WARP IN THE INSPECTION OF PRINTED CIRCUIT BOARD ASSEMBLIES

(75) Inventor: Harold Wasserman, Skillman, NJ (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 09/140,367

(22) Filed: Aug. 26, 1998

(51) Int. Cl.[7] .................................................. G01B 11/00
(52) U.S. Cl. ........................ 356/388; 237/392; 237/394
(58) Field of Search .................................. 356/388, 392, 356/394, 237

(56) References Cited

U.S. PATENT DOCUMENTS 4,978,220  12/1990  Abramovich et al. ............... 356/394

FOREIGN PATENT DOCUMENTS

| 0 312 046 A2 | 4/1989 | (EP) | ............................... G01N/21/88 |
| 0 336 563 | 10/1989 | (EP) | ............................... H05K/13/00 |
| 0 371 650 | 6/1990 | (EP) | ............................... G01B/11/24 |
| 8-193816 | 7/1996 | (JP) . | |

*Primary Examiner*—Frank G. Font
*Assistant Examiner*—Reginald A. Ratliff
(74) *Attorney, Agent, or Firm*—Teradyne Legal Department

(57) ABSTRACT

A system for inspecting potentially warped printed circuit board assemblies is disclosed. The system includes an inspection head with an axial, centrally located camera, and a laser disposed at an angle off the central axis. The central camera and the angled laser can be used during an initial scan of a printed circuit board assembly to measure and compensate for warp in the assembly, thereby making a subsequent inspection of the assembly more accurate.

20 Claims, 4 Drawing Sheets

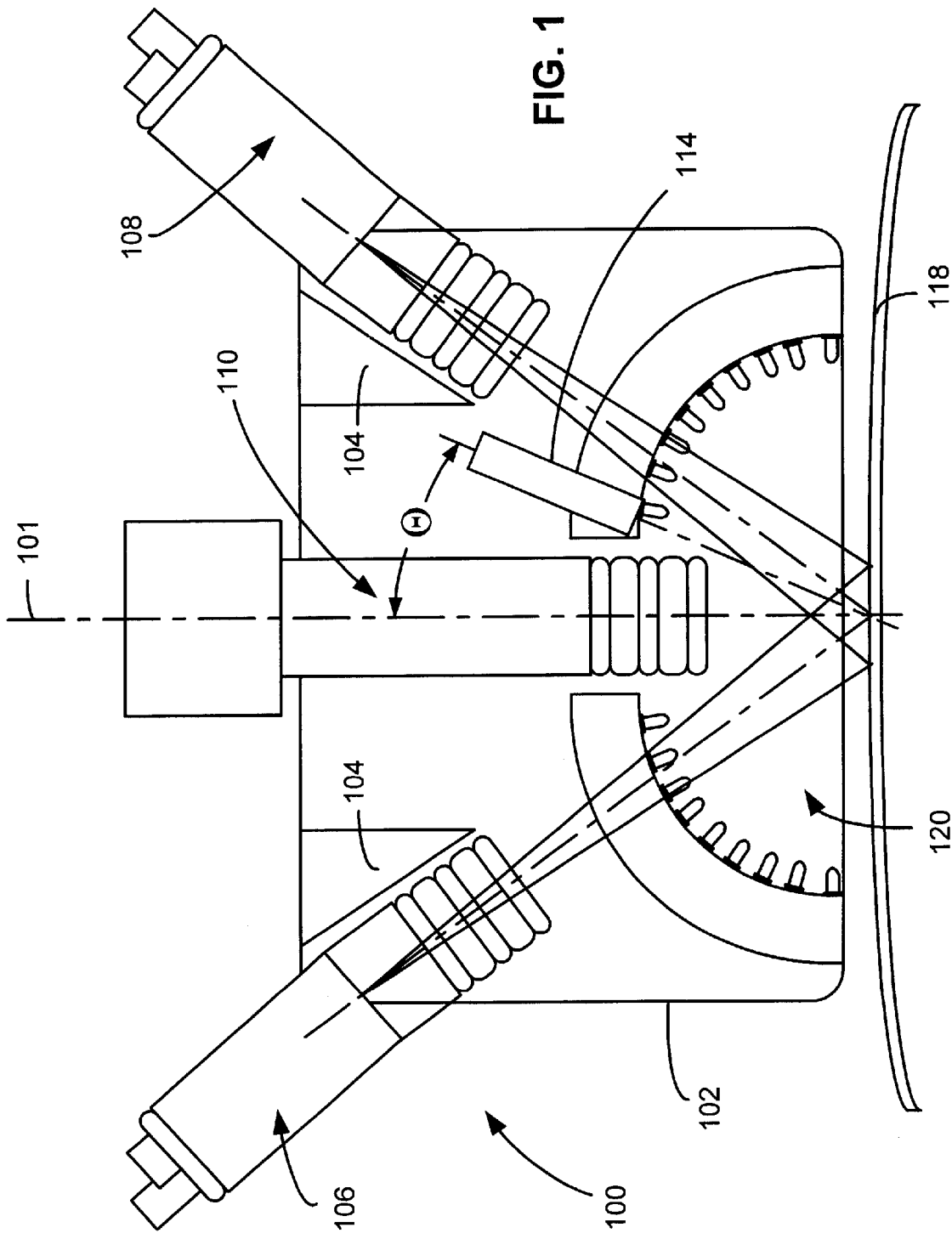

MEASURING AND COMPENSATING FOR WARP IN THE INSPECTION OF PRINTED CIRCUIT BOARD ASSEMBLIES

This invention relates generally to automated inspection systems, and more particularly to automated optical inspection systems for inspecting printed circuit board assemblies.

Printed circuit board assemblies are typically inspected during manufacturing processes to determine whether the assemblies contain defects. In this way, defective assemblies can be identified before they are incorporated into electronic products, thereby minimizing the chance that the electronic products will fail prematurely in the field.

One type of printed circuit board inspection system that has gained wide acceptance in industry uses a technology known as automated optical inspection (AOI). One such AOI system is the INTERSCAN™ inspection system, sold by TERADYNE®, Inc., Walnut Creek, Calif., USA. This system generally uses a plurality of cameras mounted in an inspection head for capturing images of a board under inspection (BUI). The inspection head is generally supported and moved in a defined plane by an X-Y table. The system also generally uses a lighting fixture mounted in the inspection head for selectively illuminating portions of the BUI. By moving the inspection head relative to the BUI, various portions of the BUI can therefore be illuminated and images of the BUI can be captured for subsequent analysis by a test computer, which is also included in the system. Any defects found during the analysis are then reported to a human operator for appropriate correction.

Details about the general structure and operation of the inspection head, the X-Y table, and the cameras included in the INTERSCAN™ inspection system can be obtained by referring to U.S. Pat. No. 5,245,421 assigned to Control Automation Incorporated, Princeton, N.J., USA. Further, details about the general structure and operation of the lighting fixture included in the INTERSCAN™ inspection system can be obtained by referring to U.S. Pat. No. 5,060,065 assigned to Cimflex Teknowledge Corporation, Princeton, N.J., USA.

In particular, the INTERSCAN™ inspection system has traditionally included four cameras, which are arranged conically and disposed off the central axis of the inspection head such that they protrude toward the BUI. The cameras typically deviate from the central axis by an angle of about 30°. This arrangement generally enhances the capture of light reflected from components attached to the BUI and minimizes the affects of back-scattered light from the BUI. Accordingly, images of four different views of each component may be captured by the angled cameras and subsequently analyzed for verifying characteristics such as the component's presence, placement, and connection to the BUI.

However, accommodations generally must be made when inspecting printed circuit board assemblies that have varying degrees of warp. This is because components attached to warped printed circuit boards may not appear in their expected locations when viewed by the four angled cameras. For example, warp in a BUI might cause some components to appear displaced from their expected locations. This can affect the accuracy of printed circuit board inspections.

For this reason, the INTERSCAN™ inspection system has traditionally included a warp-compensating unit, which is used to measure and compensate for warp during inspection of a BUI. Details of the structure and operation of a warp compensating unit can be found in U.S. Pat. No. 4,978,220 assigned to Cimflex Teknowledge Corporation, Princeton, N.J., USA.

In particular, the warp-compensating unit is preferably included in the inspection head in an axial and centrally located position. One embodiment of the warp-compensating unit includes a projector, which projects a pattern of light onto a portion of the surface of a BUI. The pattern might take the form of a "square" or a "cross." Each of the four angled cameras then captures an image of a "horizontal" section of the square or cross from its perspective, and these horizontal sections are analyzed to determine whether they deviate from their expected locations. The amount of deviation is proportional to the amount of warp at that portion of the BUI. Once the amount of warp is measured, the expected locations of components attached to that portion of the BUI are computationally adjusted, thereby compensating for the warp. The inspection system then analyzes the BUI to determine whether it is defective.

However, the INTERSCAN™ inspection system has recently included a fifth camera located in the axial, centrally located position in the inspection head. This is because a camera in this position, protruding perpendicularly toward a BUI, has been found to be very useful for inspecting fiducials on the BUI and for enhancing the accuracy of inspections made in conjunction with the four angled cameras.

Because the fifth camera in the INTERSCAN™ inspection system has displaced the warp compensating unit in the axial and centrally located position in the inspection head, there is a need for a new way of measuring and compensating for warp when inspecting printed circuit board assemblies.

SUMMARY OF THE INVENTION

With the foregoing background in mind, it is an object of the invention to provide an inspection system that can detect and report defects on printed circuit board assemblies.

Another object of the invention is to provide an inspection system that can accurately detect defects on warped printed circuit board assemblies.

Still another object of the invention is to provide an inspection system that can accurately verify the presence, placement, and connection of components attached to warped printed circuit board assemblies.

Yet another object of the invention is to provide an inspection system that can inspect fiducials on printed circuit board assemblies.

Yet still another object of the invention is to provide an inspection system that can measure and compensate for warp in the inspection of printed circuit board assemblies.

The foregoing and other objects are achieved by providing an automated optical inspection system including an inspection head with an axial and centrally located camera and a laser mounted at an angle from the central axis of the inspection head.

In a preferred embodiment, the laser produces a laser line on the surface of a printed circuit board assembly under inspection.

According to one feature, the laser is an infrared strobe and the vertical camera is a CCD camera.

In another embodiment, the laser projects a laser line on a calibration plate. The laser line is then segmented, and the height of each segment is measured using the central camera. The measured heights are then stored. Next, the inspection head is advanced to a plurality of viewing fields on a board under inspection, and a laser line is projected onto a surface of the board under inspection within each viewing field. The laser lines are then segmented, and the height of each segment is measured and compared with corresponding stored measurements. Next, deviations from the stored measurements are ranked. One of the ranked deviations is then selected and used to compensate for warp of the board under inspection in a respective viewing field.

According to another feature, the fourth from the smallest deviation in each viewing field is selected and used to compensate for warp in that viewing field.

Still further objects and advantages will become apparent from a consideration of the ensuing description and drawings.

BRIEF DESCRIPTION OF THE DRAWINGS

The invention will be better understood by reference to the following more detailed description and accompanying drawings in which FIG. 1 is a cross-sectional view of an inspection head according to the present invention, and FIG. 2A through FIG. 2C is a flowchart depicting an inspecting method according to the present invention.

DESCRIPTION OF THE PREFERRED EMBODIMENT

Figure 2A:
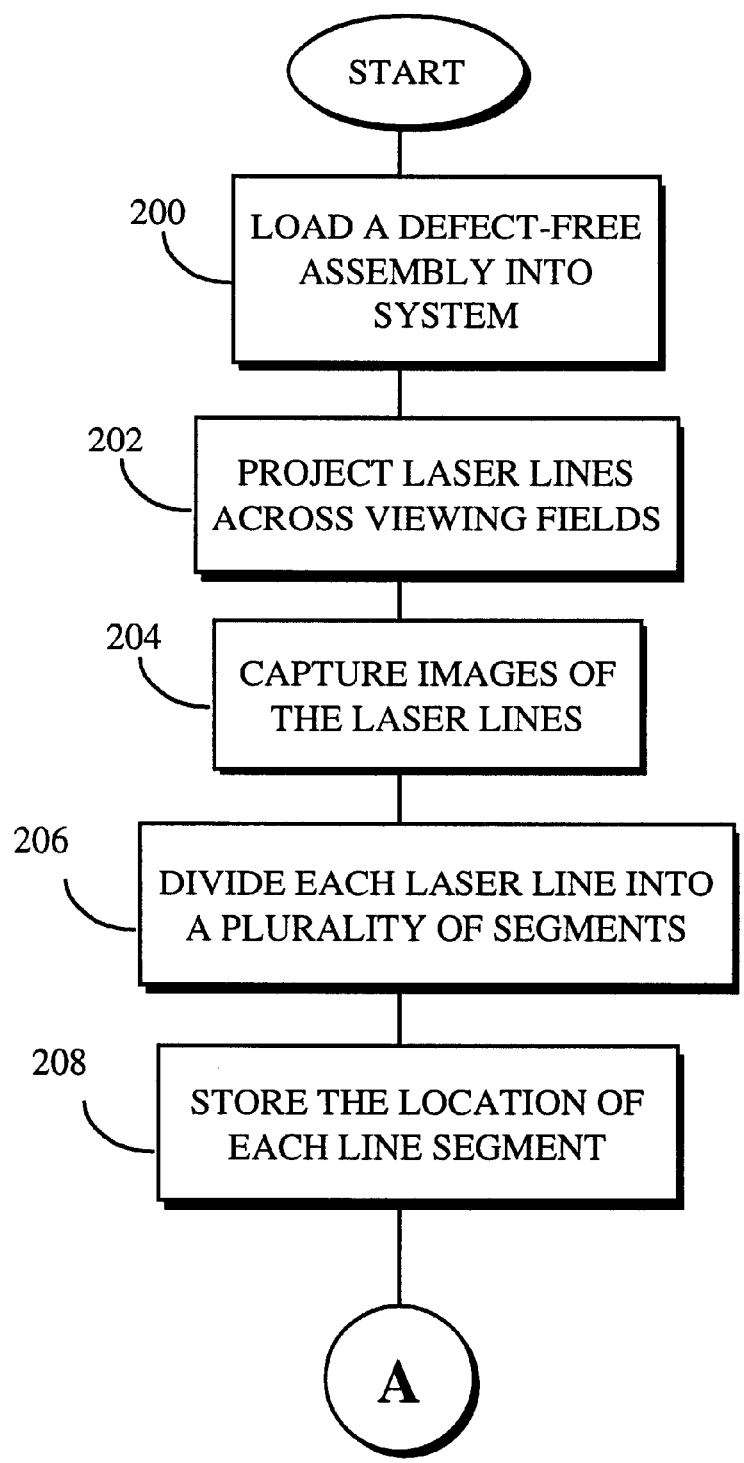

FIG. 1 shows an inspection head 100 in accordance with the present invention. The inspection head 100 is preferably used in automated optical inspection (AOI) systems such as the INTERSCAN™ series of inspection systems sold by TERADYNE™, Inc., Walnut Creek, Calif., USA.

In the configuration shown in FIG. 1, the inspection head 100 is used for inspecting the topside of a printed circuit board assembly 118 (warping of the board 118 has been exaggerated for purposes of illustration). For example, the inspection head 100 may be incorporated into the INTERSCAN™ model 5519 A+/B+ inspection system for inspecting surface mount technology (SMT) printed circuit boards from their top.

It should be understood that the inspection head 100 might also be used with other types of inspection systems. For example, the inspection head 100 may be incorporated into the INTERSCAN™ model 5515B inspection system, which inspects printed circuit boards from their bottom-side. In this case, the inspection head 100 would be inverted for inspecting, say, the connections of through-hole components on printed circuit boards from their bottom.

In each configuration, the inspection head 100 is generally supported and moved, relative to a board under inspection (BUI) and in a defined plane, by an X-Y table (not shown).

In addition, the inspection head 100 includes a cylindrical enclosure 102 with a plurality of cameras such as cameras 106, 108, and 110 disposed therein. The cameras are preferably CCD cameras. Further, the camera 110 protrudes through an aperture (not numbered) at the base of a lighting fixture 120 such that it is disposed in an axial and centrally located position in the inspection head 100.

In contrast, the cameras 106 and 108 are disposed off the central axis of the inspection head 100 by an angle of about 30°. Further, the cameras 106 and 108 are secured to the enclosure 102 by mountings 104.

In the preferred embodiment, there are four cameras (including the cameras 106 and 108) arranged conically and disposed off the central axis of the inspection head 100 at about a 30° angle. A third camera (not shown) is therefore preferably located behind the camera 110, and a fourth camera (not shown) is preferably located directly opposite the third camera. Accordingly, there are five cameras disposed in the inspection head 100—four (4) angled cameras (including the cameras 106 and 108) and one (1) vertical camera (i.e., the camera 110).

The lighting fixture 120 is mounted such that its open end is in registration with the BUI 118. Further, apertures (not shown) are provided in the lighting fixture 120 so that the angled cameras, such as the cameras 106 and 108, can capture images of the BUI 118. The five cameras, including the cameras 106, 108, and 110, are preferably positioned such that their respective axes converge at the open base of the enclosure 102, thereby defining a viewing field 116 on the BUI 118. The dimensions of the viewing field 116 are typically about 1 inch by 1 inch.

General details about the structure of the inspection head 100 and its operation in an AOI inspection system can be obtained by referring to U.S. Pat. No. 5,060,065 to Wasserman and U.S. Pat. No. 5,245,421 to Robertson et al., both of which are fully incorporated herein by reference.

The inspection head 100 also preferably includes a laser 114, which is secured in and protrudes through another aperture (not numbered) in the lighting fixture 120. The laser 114 is preferably an infrared laser, which may be obtained from LASIRIS™, Inc., Quebec, Canada. Further, the laser 114 projects light onto the BUI 118 and within the viewing field 116.

The laser 114 is preferably disposed off the central axis of the inspection head 100 by an angle Θ (FIG. 1), which is about 10°. This permits the five cameras (including the cameras 106, 108 and 110), the lighting fixture 120, and the laser 114 to fit within the enclosure 102, which is preferably the same enclosure used in earlier inspection heads. The inspection head 100 according to the invention can therefore easily replace inspection heads used in current AOI inspection systems.

The position of the laser 114 in the inspection head 100 also permits the laser 114 to be used to measure and compensate for warp on the BUI 118. In particular, the laser 114 preferably has a diffractive optic, which forms a line of laser light on a surface with minimal distortion. The laser 114 therefore projects laser light within the viewing field 116 and forms a low-distortion line of laser light on the surface of the BUI 118.

Because the laser 114 is preferably disposed off the central axis of the inspection head 100 by the angle Θ, the plane of the projected line of laser light is also at an angle Θ from the central axis. Consequently, if the viewing field 116 encompasses a portion of the BUI 118 that is warped, then the position of the projected line of laser light within the viewing field 116 may appear displaced from its expected position.

Any displacement in the position of the projected line of laser light is preferably detected using the vertical camera 110. This is because the vertical camera 110 views the BUI 118 along an axis that is perpendicular to the BUI 118 and is therefore better able to capture an image showing the displacement.

For example, if the viewing field 116 encompasses a portion of the BUI 118 that is warped, then the distance between that portion of the BUI 118 and the vertical camera 110 may increase or decrease slightly. This means that components attached to that portion of the BUI 118 may appear slightly displaced from their expected locations when viewed from the perspective of the four angled cameras (e.g., the cameras 106 and 108). Although these components may in fact be properly attached to the BUI 118, warp in the BUI 118 may cause the inspection system to flag them as being defective.

It is important to note that warp in the BUI 118 must be measured and compensated for only for those inspections that use the angled cameras (e.g., the cameras 106 and 108). Inspections that use only the vertical camera 110 are not affected by warp in the BUI 118. This is because warp in the BUI 118 generally causes a change in the distance between the vertical camera 110 and the BUI 118. However, this change in vertical distance does not generally cause components within the viewing field 116 to appear displaced from their expected positions when viewed by the vertical camera 110.

For this reason, warp in the BUI 118 is preferably measured and compensated for only when performing inspections with at least one of the four angled cameras (e.g., the cameras 106 and 108). This is done by measuring any displacement of the projected line of laser light within the viewing field 116. The expected locations of any components within the viewing field 116 are then computationally adjusted by amounts that are proportional to the measured displacement of the line of laser light.

In the preferred embodiment, the inspection head 100 scans successive viewing fields continuously during inspection of the BUI 118. For this reason, the laser 114 is preferably a strobe. The laser 114 and the vertical camera 110 can therefore be used to synchronously strobe and capture images of lines of laser light on the BUI 118 during an initial scan of the assembly. The captured images can then be analyzed to measure and compensate for warp in the BUI 118. It is expected that measuring and compensating for warp in this way will be much faster than conventional methods.

Because the laser 114 is preferably a strobe, the captured images of the lines of light are not blurred in the direction of scanning of the BUI 118. Such blurring can adversely affect the accuracy of warp measurements made using the vertical camera 110. This is especially the case for densely populated boards where a blurred line of laser light might inadvertently impinge upon a component within the viewing field 116, thereby making accurate warp measurements very difficult.

The duty cycle of the laser strobe 114 is preferably about 300 $\mu$secs. In order to provide a useful line of laser light, this would normally require a high power laser that is capable of producing a very bright light. For this reason, the laser 114 is preferably an infrared laser.

Although the infrared laser 114 does not produce light in the visible portion of the frequency spectrum, the light produced by the laser 114 can be detected by the vertical camera 110. This is because the vertical camera 110 is preferably a CCD camera, which is sensitive to light in the infrared band. Some CCD cameras include an infrared filter. If any of these cameras are used as the vertical camera 110, then the infrared filter must be removed before inspecting a printed circuit board assembly.

Further, the laser 114 does not have to be a high power laser to produce light that can be detected by the vertical CCD camera 110. An infrared laser that consumes about 100 mW of power is expected to be sufficient.

Figure 2B:
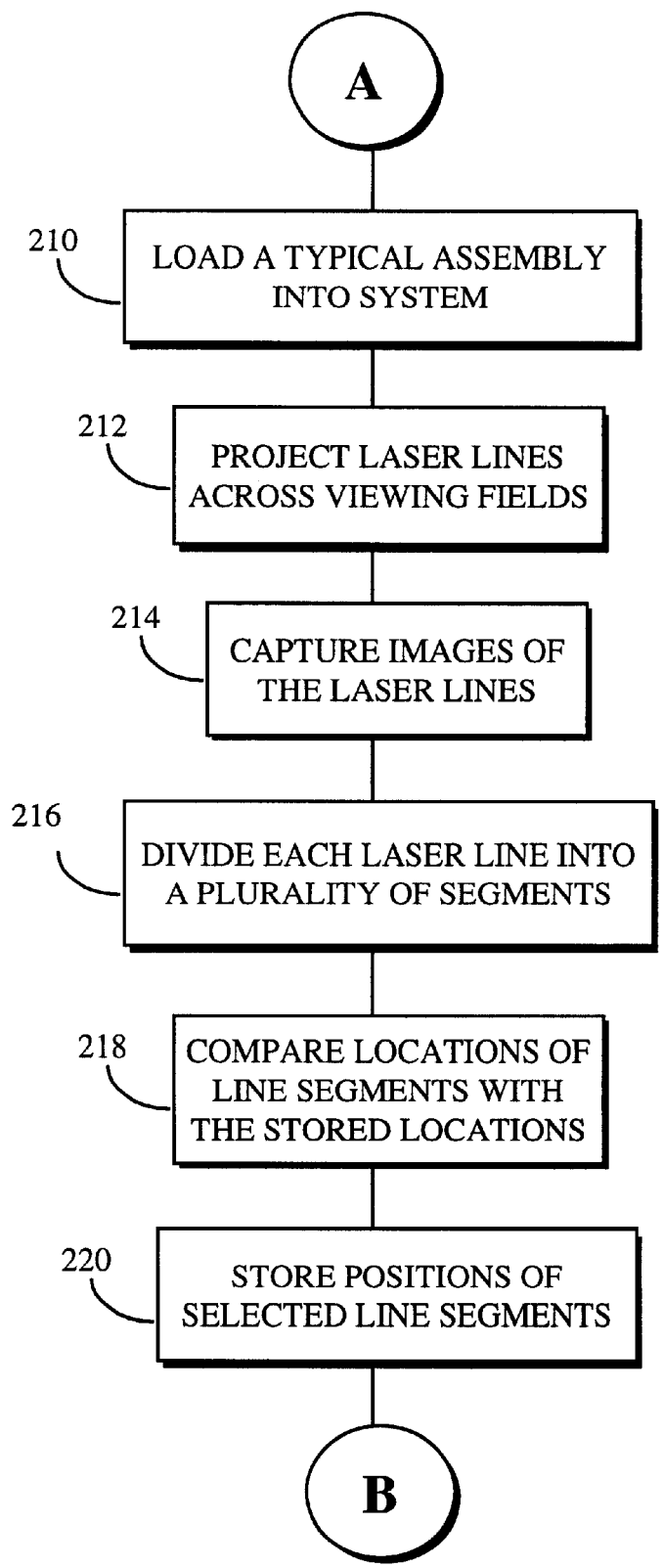
Figure 2C:
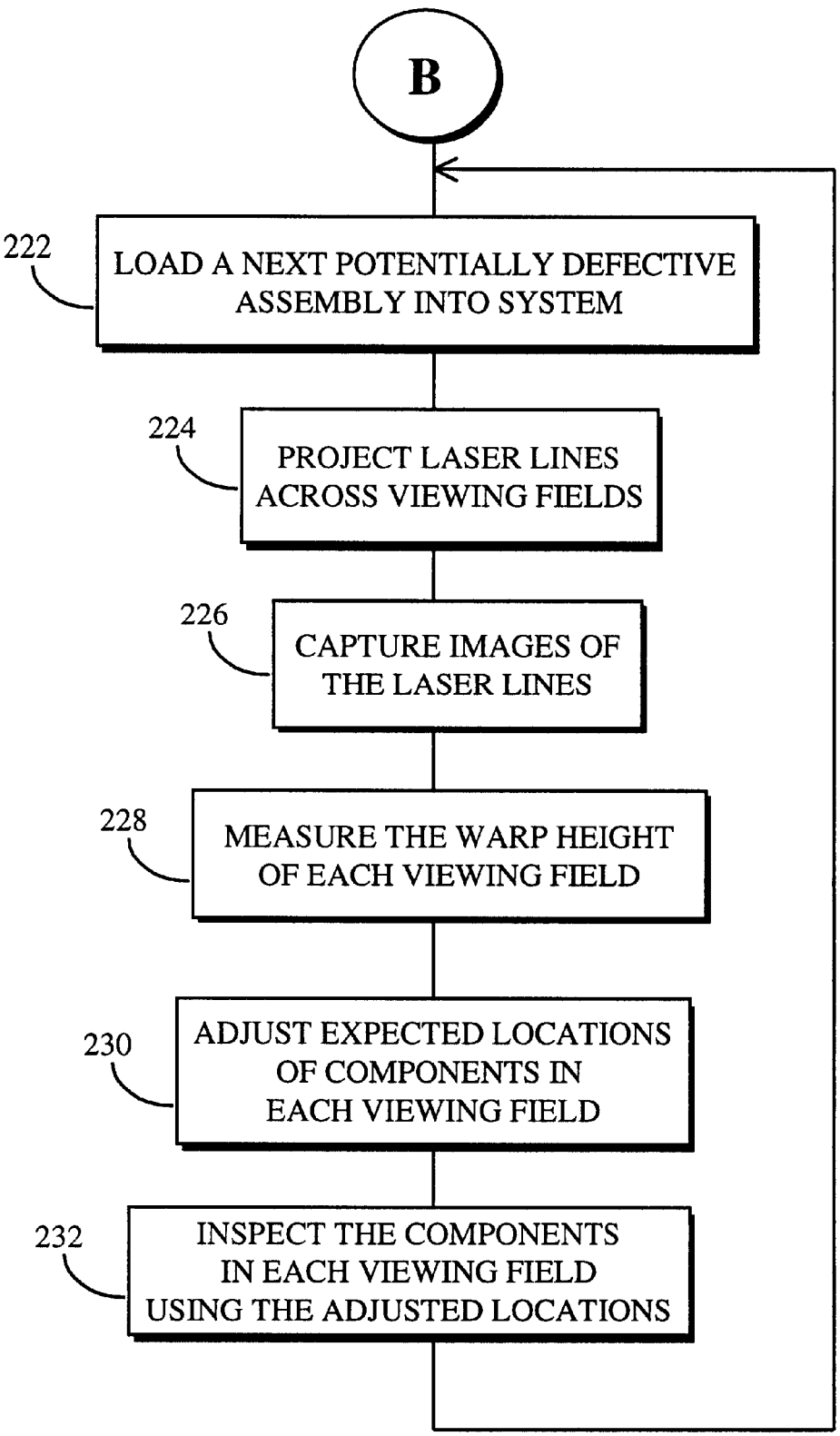

Warp in printed circuit board assemblies is measured and compensated for in accordance with the procedure shown in FIG. 2A through FIG. 2C. This procedure is typically performed under control of software that is programmed into a test computer (not shown) included in the inspection system.

First, a defect-free printed circuit board assembly is loaded into the inspection system in block 200 (FIG. 2A). This defect-free assembly is known to have no defectively attached components, and is known to be warp-free.

Next, the inspection head is positioned in registration with the defect-free assembly. Laser lines are then projected across successive viewing fields on the defect-free assembly in block 202. In particular, the laser lines are projected across viewing fields encompassing components that are to be inspected using the angled cameras. The laser lines may be projected anywhere across these viewing fields, so long as the lines do not impinge upon any components encompassed by the viewing fields.

As mentioned above, only inspections made using the angled cameras are affected by warp. It is therefore unnecessary to project the laser lines across viewing fields that encompass no components or that are to be inspected using only the vertical camera.

Images of the laser lines projected across the viewing fields are then captured in block 204. This is preferably done using the vertical camera in the inspection head. In particular, each viewing field generally defines a pixel space of the vertical camera. Further, pluralities of pixels typically have corresponding X-Y locations within the pixel spaces. The resolution of each pixel space is typically 640 pixels in the X direction and 480 pixels in the Y direction.

Accordingly, each captured image includes data relating to pixels in a corresponding defined pixel space of the vertical camera. Further, the laser projecting the laser lines is preferably angled relative to the Y direction of the pixel space. This means that any warp in a printed circuit board assembly will generally cause a captured image of a laser line to move in the Y direction of the pixel space, only.

Next, the captured images are analyzed by the test computer in block 206. In particular, images of the laser lines are divided into a plurality of line segments. In the preferred embodiment, each laser line image is divided into thirty-two (32) contiguous segments. Because the laser lines are projected across the viewing fields and the viewing fields are typically 640 pixels wide, each line segment may therefore be 20 pixels long.

The locations of the thirty-two (32) line segments within each viewing field are then determined and stored in memory (not shown) included in the test computer in block 208. For example, X-Y coordinates might be assigned to the line segments to specify their locations within respective viewing fields.

These stored locations are used as expected line segment locations during subsequent inspections of potentially warped printed circuit board assemblies. In other words, these stored locations are where the inspection system would expect to find the projected line segments on assemblies that are not warped.

Next, a typical printed circuit board assembly, such as the BUI 118, is loaded into the inspection system in block 210 (FIG. 2B).

Accordingly, the inspection head is positioned in registration with the typical assembly. Laser lines are then projected across successive viewing fields on the typical assembly in block 212. These viewing fields are identical to the viewing fields used in block 202. Further, the laser lines are projected across these viewing fields as in block 202.

Images of the laser lines projected across the viewing fields on the typical assembly are then captured in block 214. Again, this is preferably done using the vertical camera in the inspection head.

Next, the captured images are analyzed by the test computer in block 216. In particular, the laser lines are divided into a plurality of line segments as in block 206. Accordingly, each laser line is divided into thirty-two (32) contiguous segments.

The locations of the thirty-two (32) line segments in each viewing field on the typical assembly are then determined and compared with corresponding expected locations in block 218. These expected locations were stored in memory in block 208.

As described above, varying degrees of warp in printed circuit board assemblies can cause displacements of laser lines projected onto the assemblies by the angled laser 114. Further, we have recognized that the location of a small segment of a line of laser light can be determined with much more certainty than the location of the entire line. Accordingly, the line segment locations are preferably compared in block 218 by measuring any displacements that might exist relative to the stored expected locations.

As mentioned above, any warp in a printed circuit board assembly will generally cause an image of a laser line to move in the Y direction of the pixel space of the vertical camera. This is because the laser is preferably angled relative to the Y-axis of the pixel space.

Accordingly, any displacements that might exist relative to the expected locations may be measured by simply counting the number of pixels along the Y-axis between the actual and expected line segment locations. The number of pixels counted for each line segment corresponds with the displacement of the line segment due to warp in the printed circuit board.

The measured values of the displacements of the selected line segments are proportional to the "warp heights" of the respective viewing fields, which is the change in height of the printed circuit board due to warp. This change in height may be relative to the vertical camera or one of the angled cameras.

For example, the number of pixels counted for each line segment may be referred to as the pixel deflection of the line segment. The warp height of a respective viewing field relative to the vertical camera may therefore be expressed using the following formula:

$$\text{Warp Height} = (\text{Pixel Deflection})/\tan\Theta \qquad (\text{eq. 1})$$

where $\Theta$ is the angle at which the laser is disposed off the central axis of the inspection head. As mentioned above, the angle $\Theta$ is preferably 10°. The Pixel Deflection is normally expressed in mil units.

Next, the measured values of the displacements of the line segments in each viewing field are ranked. One of the line segments in each viewing field is then selected based on its ranking, and the positions of these selected line segments are stored in memory in block 220.

Further, the positions of these selected line segments will be used for measuring warp during all subsequent inspections.

In particular, the positions of the selected line segments relative to their respective laser lines are stored in block 220. For example, each laser line is preferably divided into thirty-two (32) line segments. These line segments might be numbered from zero (0) to thirty-one (31). The positions of the selected line segments relative to their respective laser lines might therefore be indicated and stored using their assigned numbers.

In the preferred embodiment, a line segment in each viewing field with the fourth largest displacement value for that field is selected for use during all subsequent inspections. This is because we have empirically determined that measuring the warp height for a viewing field using the line segment with the fourth largest displacement value sufficiently reduces specular interference, which can lead to inaccurate warp measurements. Such specular interference frequently occurs when a line of laser light does not impinge upon a component but instead reflects off a solder joint or a lead on the component.

Blocks 200 through 220 of the procedure shown in FIG. 2 are primarily meant to be performed during an initial calibration of the inspection system. Blocks 200 through 220 are therefore performed relatively infrequently. However, blocks 222 through 232 (FIG. 2C) are meant to be performed repeatedly in a manufacturing process for inspecting volume quantities of printed circuit board assemblies.

In particular, a potentially defective printed circuit board assembly is loaded into the inspection system in block 222 (FIG. 2C).

Accordingly, the inspection head is positioned in registration with the potentially warped assembly. Laser lines are then projected across successive viewing fields on the potentially defective assembly in block 224. Again, these viewing fields are identical to the viewing fields used in block 202. Further, the laser lines are projected across these viewing fields as in block 202.

Images of the laser lines are then captured in block 226. Again, this is preferably done using the vertical camera in the inspection head.

Next, the captured images are analyzed by the test computer in block 228. In particular, the locations of line segments at the positions stored in block 220 are compared with the expected locations stored in block 208, thereby measuring the warp height of each viewing field.

Expected locations of components in each viewing field are then computationally adjusted in block 230 by amounts that are proportional to the warp heights measured in block 228, thereby compensating for the warp in each viewing field. The expected component locations are typically stored in memory during the initial calibration of the inspection system. The computed adjustments to these expected locations are then stored in memory.

As mentioned above, each viewing field generally defines a pixel space of a camera. The expected locations of components in each viewing field may therefore be computationally adjusted by adjusting the pixel space of the camera.

For example, once the warp height of a respective viewing field is known, the amount of adjustment for the pixel space of the camera may be computed using the following formula:

$$\text{Pixel Space Adjustment} = (\text{Warp Height})/\cos\Psi \qquad (\text{eq. 2})$$

where $\Psi$ is the angle at which the camera is disposed off the central axis of the inspection head. As mentioned above, the angle $\Psi$ is preferably 30° for the angled cameras. Further, the Warp Height is normally expressed in mil units.

Finally, the components in each viewing field are inspected in block 232 using the adjustments stored in block 230.

Measuring and compensating for warp in printed circuit board assemblies using the procedure described above yields several advantages. For example, this procedure can be used with inspection systems that have an inspection head with an axial, centrally located camera, such as the vertical camera 110.

Further, this procedure is expected to be much faster than conventional techniques for measuring and compensating for warp in printed circuit board assemblies. This is because this procedure may be combined with an initial search scan using the vertical camera.

In particular, an initial search scan is frequently performed on printed circuit board assemblies before performing precise inspections of components attached to the assemblies. For example, an initial search scan might be performed using the vertical camera for inspecting fiducials and for determining the mere presence of the components. Any inspections or determinations made during the initial search scan are not affected by warp because they are performed using only the vertical camera. Further, the procedure shown in FIG. 2A through FIG. 2C may quickly and conveniently be performed once during this initial scan before performing the precise inspections using the angled cameras, which are generally affected by warp.

Having described one embodiment, numerous alternative embodiments or variations might be made. For example, it was described that a defect-free printed circuit board assembly is used during the calibration of the inspection system. However, this was merely an illustration. A calibration plate might be used instead of the defect-free assembly.

In particular, a laser line might be projected onto the calibration plate, and heights of a plurality of line segments might be determined using standard triangulation techniques. Corresponding heights might then be determined on a typical printed circuit board assembly and compared with the heights for the calibration plate. Next, any deviations between the two sets of height values might be ranked as described above and used to select line segments for measuring warp height.

In addition, it was described that the positions of the line segments with the fourth largest displacement values are stored for use during subsequent inspections (see block 220 in FIG. 2B). These line segments are meant to be selected automatically by the test computer. However, this is also merely an illustration. An operator of the inspection system might alternatively select a line segment in each viewing field manually.

In particular, the inspection head might be stepped to a viewing field, and a laser line might then be projected across the viewing field. Next, the operator might view a live image of the assembly. The operator might then be prompted to select a line segment that does not impinge upon any components within the viewing field. Although this approach is much simpler, it would probably be slower than the automatic approach described above.

Therefore, the invention should be limited only by the spirit and scope of the appended claims.

What is claimed is:

1. A system for performing automated optical inspection of a printed circuit board assembly, the system including an inspection head having a vertical axis with a lighting fixture for successively illuminating a plurality of viewing fields on the assembly and at least one camera angled with respect to the vertical axis for capturing images of the viewing fields, the inspection head further comprising:
    a laser angled with respect to the vertical axis for projecting a line of light across at least a portion of the viewing fields; and
    a vertical camera substantially parallel with the vertical axis for capturing images of the lines of light,
    wherein the system compares locations of the lines of light in the captured images with expected locations and uses differences from the expected locations for measuring and compensating for warp in the assembly.

2. The system as recited in claim 1,
    wherein the inspection head has an axis perpendicular to the assembly and the laser is disposed in the inspection head at an angle from the perpendicular axis.

3. The system as recited in claim 2,
    wherein the laser is disposed in the inspection head at an angle of 10° from the perpendicular axis.

4. The system as recited in claim 2,
    wherein the vertical camera is disposed in the inspection head along the perpendicular axis.

5. The system as recited in claim 1,
    wherein the angled laser projects infrared light.

6. The system as recited in claim 5,
    wherein the vertical camera is a CCD camera.

7. The system as recited in claim 1,
    wherein the amount of warp in a viewing field is proportional to the difference in the expected location of the line of light in the viewing field.

8. The system as recited in claim 7,
    wherein the system compensates for warp in a viewing field by adjusting expected locations of components in the viewing field by an amount proportional to the warp in the viewing field.

9. A method of measuring and compensating for warp in a printed circuit board assembly, used in an automated optical inspection system having a vertical axis for determining whether the assembly contains defects, comprising the steps of:

(a) projecting a line of light across at least one viewing field on the assembly, the line of light being projected at an angle with respect to the vertical axis;

(b) capturing an image of the line of light with a camera mounted parallel to the vertical axis;

(c) comparing the location of the line of light with an expected location for determining a difference from the expected location; and (d) adjusting expected locations of components within the viewing field by an amount proportional to the difference determined in step (c).

10. The method as recited in claim 9,
    wherein the line of light is projected by a laser.

11. The method as recited in claim 9,
    wherein the image of the line of light is captured by a camera disposed perpendicular to the viewing field.

12. The method as recited in claim 9,
    wherein the line of light is projected in step (a) such that it does not impinge upon any components attached to the assembly in the viewing field.

13. The method as recited in claim 9,
    wherein the comparing in step (c) includes dividing the image of the line of light into a plurality of segments and comparing the location of at least one of the segments with an expected location for the segment.

14. The method as recited in claim 13,
    wherein the image of the line of light is divided into thirty-two (32) segments.

15. The method as recited in claim 9, further comprising the steps of (e) projecting a line of light across a calibration plate, (f) capturing an image of the line of light projected in step (e), and (g) determining a location of the line of light on the calibration plate, wherein the determined location is used as an expected location during the inspection of the assembly.

16. The method as recited in claim 15,
    further comprising the steps of dividing the image of the line of light captured in step (f) into a plurality of segments and determining the location of each segment on the calibration plate.

17. The method as recited in claim 16,
    further comprising the steps of dividing the image of the line of light captured in step (b) into a plurality of segments and determining the location of each segment on the assembly.

18. The method as recited in claim 17,
    further comprising the steps of comparing the segment locations on the assembly with corresponding segment locations on the calibration plate for determining a displacement for each segment location on the assembly, the displacements being proportional to the warp of the assembly within the viewing field.

19. The method as recited in claim 18,
    further comprising the step of selecting a segment based upon the magnitude of its corresponding displacement and using segments corresponding to the selected segment during all subsequent inspections of assemblies.

20. The method as recited in claim 19,
    wherein the displacement corresponding to the selected segment has the fourth largest magnitude.

* * * * *